(12) United States Patent
Takano et al.

(10) Patent No.: US 9,769,168 B2
(45) Date of Patent: Sep. 19, 2017

(54) MOBILE DEVICE AND METHOD

(71) Applicant: CANON KABUSHIKI KAISHA, Tokyo (JP)

(72) Inventors: Shinichi Takano, Akashi (JP); Takeshi Ishikura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 14/860,265

(22) Filed: Sep. 21, 2015

(65) Prior Publication Data
US 2016/0087982 A1    Mar. 24, 2016

(30) Foreign Application Priority Data

Sep. 24, 2014 (JP) ................................. 2014-194368

(51) Int. Cl.
| | |
|---|---|
| *H04W 12/06* | (2009.01) |
| *H04L 29/06* | (2006.01) |
| *G06F 21/45* | (2013.01) |
| *H04W 4/00* | (2009.01) |
| *H04W 88/02* | (2009.01) |
| *H04W 12/08* | (2009.01) |
| *H04W 4/02* | (2009.01) |

(52) U.S. Cl.
CPC ......... *H04L 63/0876* (2013.01); *H04W 12/06* (2013.01); *H04W 4/008* (2013.01); *H04W 4/023* (2013.01); *H04W 12/08* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 8,768,306 B1 | 7/2014 | Ben Ayed | |
| 2006/0088192 A1 | 4/2006 | Parhofer | |
| 2009/0036097 A1 | 2/2009 | Satou | |
| 2009/0117860 A1* | 5/2009 | Kimura | H04B 1/1615 455/88 |
| 2011/0237268 A1* | 9/2011 | Tsuda | H04W 72/0453 455/450 |
| 2011/0238995 A1* | 9/2011 | Blanco | H04L 63/0492 713/173 |
| 2014/0099987 A1* | 4/2014 | Saito | H04W 4/08 455/519 |

FOREIGN PATENT DOCUMENTS

| | | |
|---|---|---|
| EP | 1826700 A1 | 8/2007 |
| EP | 2469480 A1 | 6/2012 |

(Continued)

OTHER PUBLICATIONS

Bluetooth Low Energy, Beacons, and Retail. Vlugt, Erik.Verifone Whitepaper. 2013.*

(Continued)

*Primary Examiner* — Venkat Perungavoor
(74) *Attorney, Agent, or Firm* — Canon USA Inc., IP Division

(57) ABSTRACT

According to authentication by an external authentication system, a mobile device according to the present invention appropriately controls a start or a stop of a function of automatically sending a signal using wireless communication and a content of the signal.

18 Claims, 19 Drawing Sheets

(56) References Cited

FOREIGN PATENT DOCUMENTS

| | | | |
|---|---|---|---|
| IN | WO 2011004401 A2 * | 1/2011 | ............. G06Q 20/02 |
| JP | 2013-236255 A | 11/2013 | |
| RU | 2491771 C2 | 8/2013 | |
| WO | 2005/104704 A1 | 11/2005 | |

OTHER PUBLICATIONS

A Middleware Based Approach to Dynamically Deploy Location Based Services onto Hetergeneous Mobile Devices Using Bluetooth in Indoor Environment. Sadhukhan et al. ACN. 2010.*

* cited by examiner

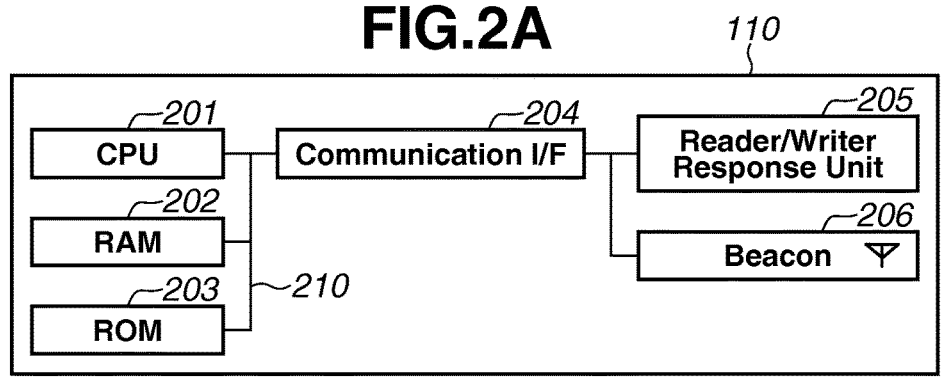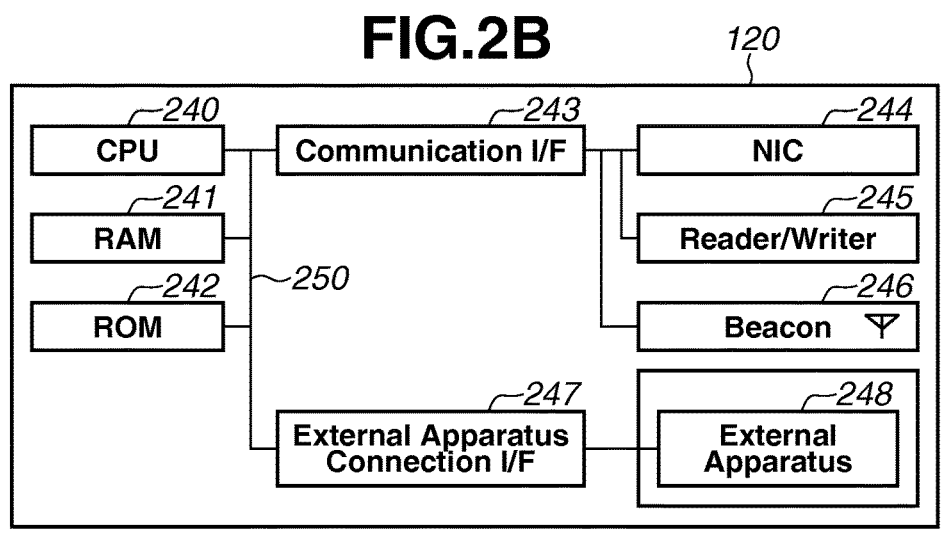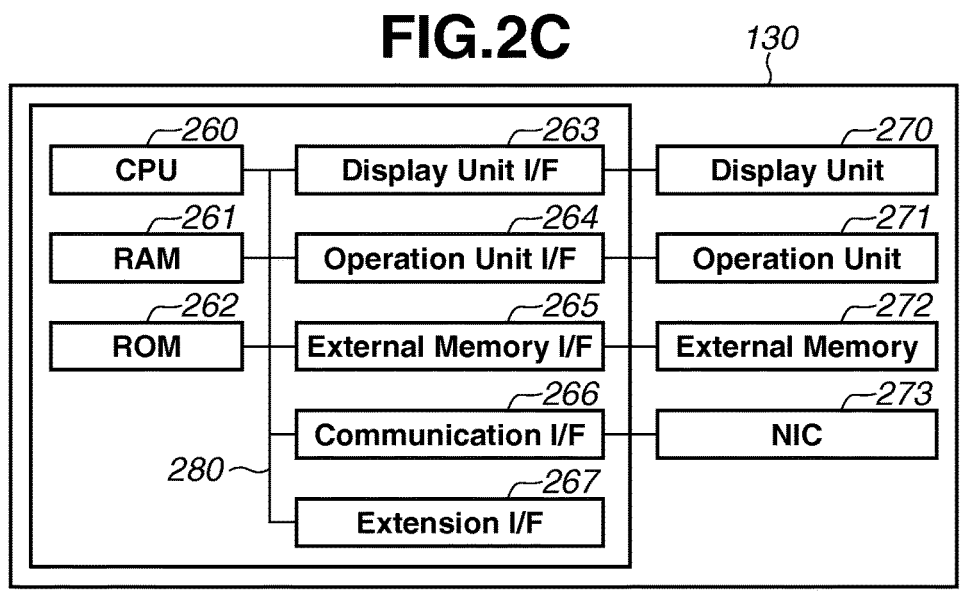

FIG.4A

| 401 | 402 | 403 | 404 | 405 | 406 |
|---|---|---|---|---|---|
| USER ACCOUNT | PASSWORD | AUTHENTICATION INFORMATION | UUID | MAJOR NUMBER | MINOR NUMBER |
| UserA | 45yh5b4j | gi9j39t74mks | 4hj45hjd | 110 | 9402 |
| UserB | kj4ui45j | mgj023gjsjer | bk300h9w | 110 | 4263 |
| UserC | js36uj56 | 3lbm4ngeh4ds | hj3kh02j | 130 | 6247 |
| UserD | ted47jhe | wgj2389tzjr3 | gh985mgl | 240 | 7324 |

FIG.4B

| 410 | 411 | 412 |
|---|---|---|
| APPARATUS ID | ROLE INFORMATION | SENDING CONTROL INFORMATION |
| 123456 | GateA, Entrance | Send |
| 789012 | GateA, Exit | Stop |
| 345678 | GateB, Entrance | Send |
| 901234 | GateB, Exit | Stop |
| 834763 | GateC, Entrance | Stop |

FIG.5

| 420 | 421 | 422 | 423 |
|---|---|---|---|
| AUTHENTICATION INFORMATION | UUID | MAJOR NUMBER | MINOR NUMBER |
| gi9j39t74mks | 4hj45hjd | 7346 | 6238 |

FIG.9

| 430 | 431 | 432 |
|---|---|---|
| APPARATUS ID | ROLE INFORMATION | SENDING CONTROL INFORMATION |
| 123456 | GateA, Entrance | Send |

FIG.10

| 440 | 441 | 442 | 443 |
|---|---|---|---|
| UUID | MAJOR NUMBER | MINOR NUMBER | DISTANCE INFORMATION |
| 4hj45hjd | 110 | 9402 | Near |

FIG.11

| 450 | 451 | 452 | 453 | 454 | 455 | 456 | 457 |
|---|---|---|---|---|---|---|---|
| USER ACCOUNT | PASSWORD | AUTHENTICATION INFORMATION | UUID | MAJOR NUMBER | MINOR NUMBER | AUTHENTICATION DATE AND TIME | AUTHENTICATION LOCATION/ AUTHENTICATION APPARATUS ID |
| UserA | 45yh5b4j | gi9j39t74mks | 4hj45hjd | 110 | 9402 | 2014/08/01 10:28:23 | 123456 |
|  |  |  |  |  |  | 2014/08/01 10:40:72 | 789012 |
|  |  |  |  |  |  | 2014/08/01 10:55:29 | 123456 |

FIG.12

| 460 | 461 | 462 | 463 | 464 | 465 | 466 | 467 | 468 |
|---|---|---|---|---|---|---|---|---|
| USER ACCOUNT | PASSWORD | AUTHENTICATION INFORMATION | UUID | MAJOR NUMBER | MINOR NUMBER | RECEPTION DATE AND TIME | RECEPTION LOCATION/ RECEPTION APPARATUS ID | DISTANCE INFORMATION |
| UserA | 46yh5b4j | gi9j39t74mks | 4hj46hjd | 110 | 9402 | 2014/08/01 10:28:23 | 123456 | Near |
| | | | | | | 2014/08/01 10:28:53 | 123456 | Far |
| | | | | | | 2014/08/01 10:28:53 | 999888 | Far |
| | | | | | | 2014/08/01 10:29:23 | 999888 | Near |
| | | | | | | 2014/08/01 10:29:53 | 999888 | Far |
| | | | | | | 2014/08/01 10:29:53 | 777666 | Far |

FIG.13

| 470 | 471 | 472 | 473 |
|---|---|---|---|
| APPARATUS ID | ROLE INFORMATION | SENDING CONTROL INFORMATION | SENDING TIMEOUT VALUE |
| 123456 | GateA, Entrance | Send | 3600 |
| 789012 | GateA, Exit | Stop | — |
| 345678 | GateB, Entrance | Send | 7200 |
| 901234 | GateB, Exit | Stop | — |
| 834763 | GateC, Entrance | Stop | — |

FIG.14

| 480 | 481 | 482 | 483 |
|---|---|---|---|
| APPARATUS ID | ROLE INFORMATION | SENDING CONTROL INFORMATION | SENDING TIMEOUT VALUE |
| 123456 | GateA, Entrance | Send | 3600 |

FIG.15A

| 490 | 491 | 492 |
|---|---|---|
| UUID | MAJOR NUMBER | MINOR NUMBER |
| 4hj45hjd | 110 | 123456 |

FIG.15B

| 495 | 496 | 497 |
|---|---|---|
| UUID | MAJOR NUMBER | MINOR NUMBER |
| 4hj45hjd | 110 | 123456, 345678, 901234 |

SENDER: System_XXXX    DESTINATION: UserA@yyyy
SUBJECT: NOTIFICATION

1802— THIS EMAIL IS AUTOMATICALLY TRANSMITTED FROM
THE MANAGEMENT SYSTEM.

DEAR USER A

AUTHENTICATION USING A SECURITY CARD MAY NOT BE
PROPERLY PERFORMED, AND IDENTIFICATION INFORMATION
OF THE CARD MAY REMAIN SENT.
BE SURE TO FOLLOW THE PROPER AUTHENTICATION
PROCEDURE.

ABOUT THE PROPER AUTHENTICATION PROCEDURE:
http://zzzz

FIG.19

| 501 | 502 | 503 | 504 | 505 | 506 | 507 | 508 | 509 | 510 |
|---|---|---|---|---|---|---|---|---|---|
| USER ACCOUNT | PASSWORD | EMAIL ADDRESS | AUTHENTICATION INFORMATION | UUID | MAJOR NUMBER | MINOR NUMBER | RECEPTION DATE AND TIME | RECEPTION LOCATION/ RECEPTION APPARATUS ID | DISTANCE INFORMATION |
| UserA | 45yh5b4j | UserA.xxx@yyy.zzz | gi9j39t74mks | 4hj45hjd | 110 | 9402 | 2014/08/01 10:28:23 | 123456 | Near |
| | | | | | | | 2014/08/01 10:28:53 | 123456 | Far |
| | | | | | | | 2014/08/01 10:29:23 | 123456 | Far |

MOBILE DEVICE AND METHOD

BACKGROUND OF THE INVENTION

Field of the Invention

The present invention relates to a wireless communication technique.

Description of the Related Art

A mechanism capable of providing various services according to the distance between devices has been developed by utilizing a communication technique for realizing low energy consumption and long-distance communication, among communication techniques for allowing devices to communicate directly with each other. As an example of such a communication technique, there is a technique termed Bluetooth (registered trademark) low energy (BLE).

For example, a mechanism using BLE is iBeacon (registered trademark). In this mechanism, first, a sender sends a signal termed a beacon, which includes device information of the sender, by broadcasting using BLE. Then, a receiver can provide various services using the device information included in the received signal and distance information obtained based on the intensity of the signal. Using this mechanism, for example, if a certain store sends a beacon signal and a mobile terminal of a customer detects the signal from the store, it is possible to provide the service of notifying the customer of sales information according to the distance between the mobile terminal and the store.

Additionally, as the conventional art for informing a user of the distance between terminals, Japanese Patent Application Laid-Open No. 2013-236255 discusses a technique using both of wireless communication, and an ultrasonic signal generator and an ultrasonic signal receiver of terminals.

There are various possible applications of the above mechanism using a signal via wireless communication such as BLE. For example, if a user needs to be authenticated to enter an office, the user always carries around a security card or a mobile terminal. If a sender for sending a signal such as a beacon signal is mounted on such a security card or a mobile terminal, it is possible to grasp the position of the user and provide various services according to the position of the user.

However, constantly sending a signal directly or indirectly related to a user coming from and going into an area where the user is required to be authenticated from a security card or a mobile terminal of the user raises concerns about security risks even if information of the signal is encrypted.

SUMMARY OF THE INVENTION

The present invention is directed to a mobile device and a method that are capable of, according to a trigger such as authentication, performing flexible control on sending of a signal such as a beacon signal and changing of the content of the signal.

According to an aspect of the present invention, a mobile device for performing communication for authentication with an external authentication system includes a transmission unit configured to transmit authentication information to the authentication system, a reception unit configured to receive from the authentication system a request according to authentication using the authentication information, and a control unit configured to, according to the received request, control at least one of a start and a stop of a function of sending a signal at a predetermined frequency or on a predetermined cycle using wireless communication.

Further features of the present invention will become apparent from the following description of exemplary embodiments with reference to the attached drawings.

BRIEF DESCRIPTION OF THE DRAWINGS

FIGS. 2A, 2B, and 2C are diagrams illustrating examples of hardware configurations of apparatuses according to the exemplary embodiments.

FIGS. 4A and 4B are diagrams illustrating examples of various data tables used by an authentication server in an authentication process.

FIG. 5 is a diagram illustrating an example of a data table used by a mobile device.

FIG. 9 is a diagram illustrating an example of authentication apparatus information used by the authentication apparatus according to the first exemplary embodiment.

FIG. 10 is a diagram illustrating an example of monitoring information using beacon information according to the first exemplary embodiment.

FIG. 11 is a diagram illustrating an example of authentication history information stored in a data storage unit according to the first exemplary embodiment.

FIG. 12 is a diagram illustrating an example of history information including distance information according to the first exemplary embodiment.

FIG. 13 is a diagram illustrating an example of a data table managed by the authentication server according to a second application example.

FIG. 14 is a diagram illustrating an example of authentication apparatus information used by an authentication apparatus according to the second application example.

FIGS. 15A and 15B are diagrams illustrating examples of various data tables used according to a third application example.

FIG. 18 is a diagram illustrating an example of contents of a warning notification according to the second exemplary embodiment.

FIG. 19 is a diagram illustrating an example of a management table of history information according to the second exemplary embodiment.

DESCRIPTION OF THE EMBODIMENTS

Exemplary embodiments of the present invention will be described below with reference to the attached drawings.

Figure 1:
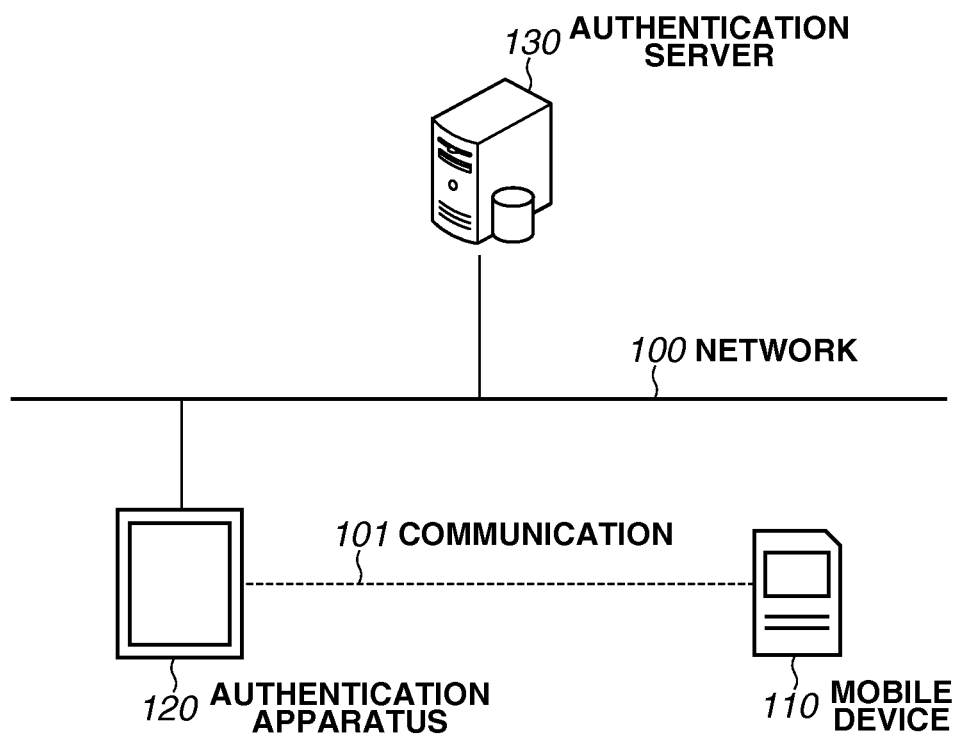
FIG. 1 is a diagram illustrating a configuration of a network system according to exemplary embodiments.

FIG. 1 is a diagram illustrating an example of a configuration of a basic network system according to a first exemplary embodiment. The network system includes an authentication apparatus 120 and an authentication server 130. The authentication apparatus 120 and the authentication server 130 forms an authentication system placed in a user environment to achieve an authentication process. The authentication apparatus 120 and the authentication server 130 are connected together via a network 100 and can communicate data with each other. Further, the authentication apparatus 120 and a mobile device 110 can communicate data with each other using communication 101. When authentication is performed, communication can be performed using the communication 101 in various forms such as a contact communication and a contactless communication. In the present exemplary embodiment, a single mobile device 110, a single authentication apparatus 120, and a single authentication server 130 are included in the network system. Alternatively, a plurality of mobile devices 110, a plurality of authentication apparatuses 120, and a plurality of authentication servers 130 may be included in the network system.

FIGS. 2A, 2B, and 2C are block diagrams illustrating examples of hardware configurations of an apparatus, a device, and a server included in the present exemplary embodiment.

FIG. 2A is a block diagram illustrating an example of a hardware configuration of the mobile device 110.

A central processing unit (CPU) 201 performs overall control of devices connected to a system bus 210, according to a program stored in a read-only memory (ROM) 203, which is a storage unit. A random-access memory (RAM) 202 functions also as a main memory and a work area for the CPU 201. The ROM 203 stores various programs and various types of data. A communication interface (I/F) 204 controls the communication of a reader/writer response unit 205 and the communication of a beacon 206. The reader/writer response unit 205 responds to a data transmission/reception request from the authentication apparatus 120, and transmits and receives data between two points. The reader/writer response unit 205 is of a contact type, which transmits and receives data by coming into direct contact with the two points, or of a contactless type, which transmits and receives data using wireless communication. The beacon 206 as a signal control unit is an interface for sending a signal, and controls the cyclical sending of a signal including an identifier that allows an external system to identify the individual device of the mobile device 110 or the user of the mobile device 110. This signal is sent to a wireless network. The cycle and the frequency of the sending of the signal may be fixed or optionally changed. In the present exemplary embodiment, beacon information will be described as an example of the signal sent, controlled by the signal control unit. Processing described in the present exemplary embodiment is achieved by the CPU 201 loading a program recorded in the ROM 203 into the RAM 202 and executing the program. Further, the mobile device 110 may further include a display unit for controlling display based on held data, and a connection unit for making a wired or wireless connection to the outside. Examples of the wired or wireless connection include connections using Universal Serial Bus (USB) and "Wireless Fidelity" also known as "Wi-Fi".

Figure 16:
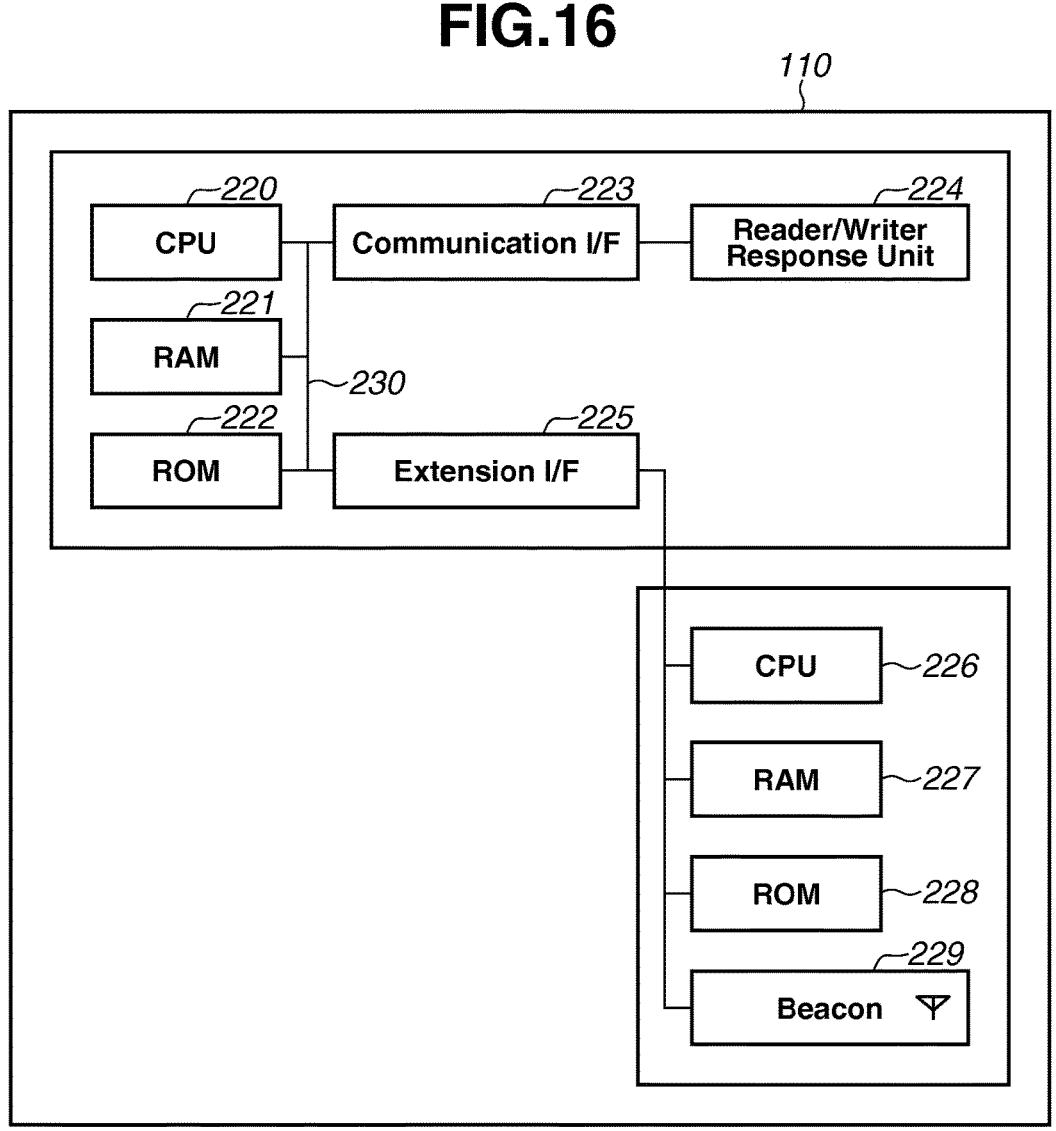
FIG. 16 is a diagram illustrating a variation of the mobile device to which the present invention is applicable.

FIG. 16 illustrates a modified example of the hardware configuration illustrated in FIG. 2A, and illustrates a mobile device 110, which has a hardware configuration different from that illustrated in FIG. 2A. The present exemplary embodiment is also applicable to the mobile device 110 having the configuration illustrated in FIG. 16.

A CPU 220, a RAM 221, and a ROM 222 are similar to the CPU 201, the RAM 202, and the ROM 203, respectively.

A communication I/F 223 controls a reader/writer response unit 224. The reader/writer response unit 224 is similar to the reader/writer response unit 205.

An extension I/F 225 is a module extension I/F. By connecting a module for sending beacon information (hereinafter, a "beacon information sending module") thereto, and the module can be controlled. In other words, the module is additionally connected to a device that does not have the function of sending beacon information, thereby enabling the device to serve as a mobile device capable of performing control equivalent to that in FIG. 2A.

The beacon information sending module includes a CPU 226, a RAM 227, a ROM 228, and a beacon 229. The CPU 226 performs overall control of devices according to a program stored in the ROM 228, which is a storage unit. The RAM 227 functions also as a main memory and a work area for the CPU 226. The ROM 228 stores various programs and various types of data for the beacon information sending module. The beacon 229 is similar to the beacon 206.

In the present exemplary embodiment, FIG. 2A is used in the following description. As an example of the mobile device 110 illustrated in FIG. 2A or 16, an integrated circuit (IC) card device (a security card) for identifying an individual to perform individual authentication is taken. Examples of the mobile device 110 may also include a smartphone, an eyeglass-type information device, a wristwatch-type information device, a car navigation system, and a robot. Further, authentication described below is also assumed to be device authentication and vehicle authentication in addition to individual authentication.

FIG. 2B is a block diagram illustrating an example of a hardware configuration of the authentication apparatus 120.

A CPU 240 controls the operation of the entirety of the authentication apparatus 120. The CPU 240 performs overall control of devices connected to a system bus 250, according to a program stored in a ROM 242. A RAM 241 functions as a main memory and a work area for the CPU 240, and is also used as an input information storage area and an environment data storage area. The ROM 242 stores a control program to be executed by the CPU 240 and various types of data. A communication I/F 243 controls the communications of a network interface card (NIC) 244, a reader/writer 245, and a beacon 246. The NIC 244 is a connection I/F with the network 100, and controls the transmission and reception of data between the authentication apparatus 120 and the authentication server 130. The reader/writer 245 transmits a data transmission/reception request, and transmits and receives data between two points according to a response from the mobile device 110. The reader/writer 245 is of a contact type, which transmits and receives data by coming into direct contact with the two points, or of a contactless type, which transmits and receives data using wireless communication.

The beacon 246 as a signal reception unit is an interface for receiving a signal such as beacon information and controls the reception of beacon information that allows the identification of the mobile device 110. An external apparatus connection I/F 247 controls an interface for an external apparatus 248 such as an automatic door or a lock. Processing described in the present exemplary embodiment is achieved by the CPU 240 reading a program recorded in the ROM 242 into the RAM 241 when necessary and executing the program.

The beacon 246 and the external apparatus connection I/F 247 are built into a control apparatus (not illustrated) other than the authentication apparatus 120 in the system. A plurality of control apparatuses having different functions may be installed. In this case, naturally, each of the control apparatuses has a hardware configuration including a ROM, a RAM, and a CPU, and can execute a predetermined control program. Specifically, when receiving beacon information that allows the identification of the mobile device 110, the control apparatus controls an interface for any external apparatus via the external apparatus connection I/F 247. More specifically, if the control apparatus receives beacon information including predetermined identification information, it is possible to control the provision of a service such as calling an elevator after specifying the destination of the elevator, starting the engine of a car, or starting and finishing imaging using a network camera. Alternatively, it is also possible, according to the reception of beacon information, to perform control to turn on a control target device, output a message, or execute a command. Yet alternatively, if a user enters a members-only store where an operation such as authentication is required, a control apparatus in the store can also receive a signal sent from a mobile device according to the operation and provide a recommended product and a predetermined message.

The authentication apparatus 120 or the control apparatus other than the authentication apparatus 120 can also switch the control of an external apparatus, according to the content of beacon information (identification information) or distance information confirmed based on the intensity of the signal of the beacon information. For example, only if a certain control apparatus receives beacon information including distance information indicating a relatively near distance and also including a particular identifier, it is possible to perform control so that imaging is started using a network camera on a particular floor.

In the present exemplary embodiment, a user having the mobile device 110 performs authentication with each of a plurality of authentication apparatuses in the range of activities at the user's home or company, and thereby can automatically receive the provision of a service by various devices based on a signal (beacon information) sent from the mobile device 110 after the authentication.

FIG. 2C is a block diagram illustrating an example of a hardware configuration of the authentication server 130.

A CPU 260 controls the operation of the entirety of the authentication server 130. The CPU 260 performs overall control of devices connected to a system bus 280, according to a program stored in a ROM 262. A RAM 261 functions as a main memory and a work area for the CPU 260 and is also used as an input information storage area and an environment data storage area. The RAM 261 also includes a non-volatile RAM (NVRAM) area, and is configured to expand the memory capacity using an optional RAM connected to an additional port (not illustrated). The ROM 262 stores a control program to be executed by the CPU 260, and various types of data. A display unit I/F 263 controls an interface for a display unit 270. An operation unit I/F 264 controls an interface for an operation unit 271, which includes a button, a touch panel, a keyboard, and a pointing device. An external memory I/F 265 controls access to and from an external memory 272 such as a flash memory or a solid-state disk (SSD). The external memory 272 functions as a recordable and readable storage medium, and stores an operating system (OS) and an application. A communication I/F 266 controls the communication of an NIC 273. The NIC 273 is a connection I/F for the network 100 and controls the transmission and reception of data between the authentication server 130 and the authentication apparatus 120. Processing described in the present exemplary embodiment is achieved by the CPU 260 reading a program recorded in the external memory 272 into the RAM 261 when necessary and executing the program. The program may be stored in the RAM 261 or the ROM 262 instead of the external memory 272.

Figure 3:
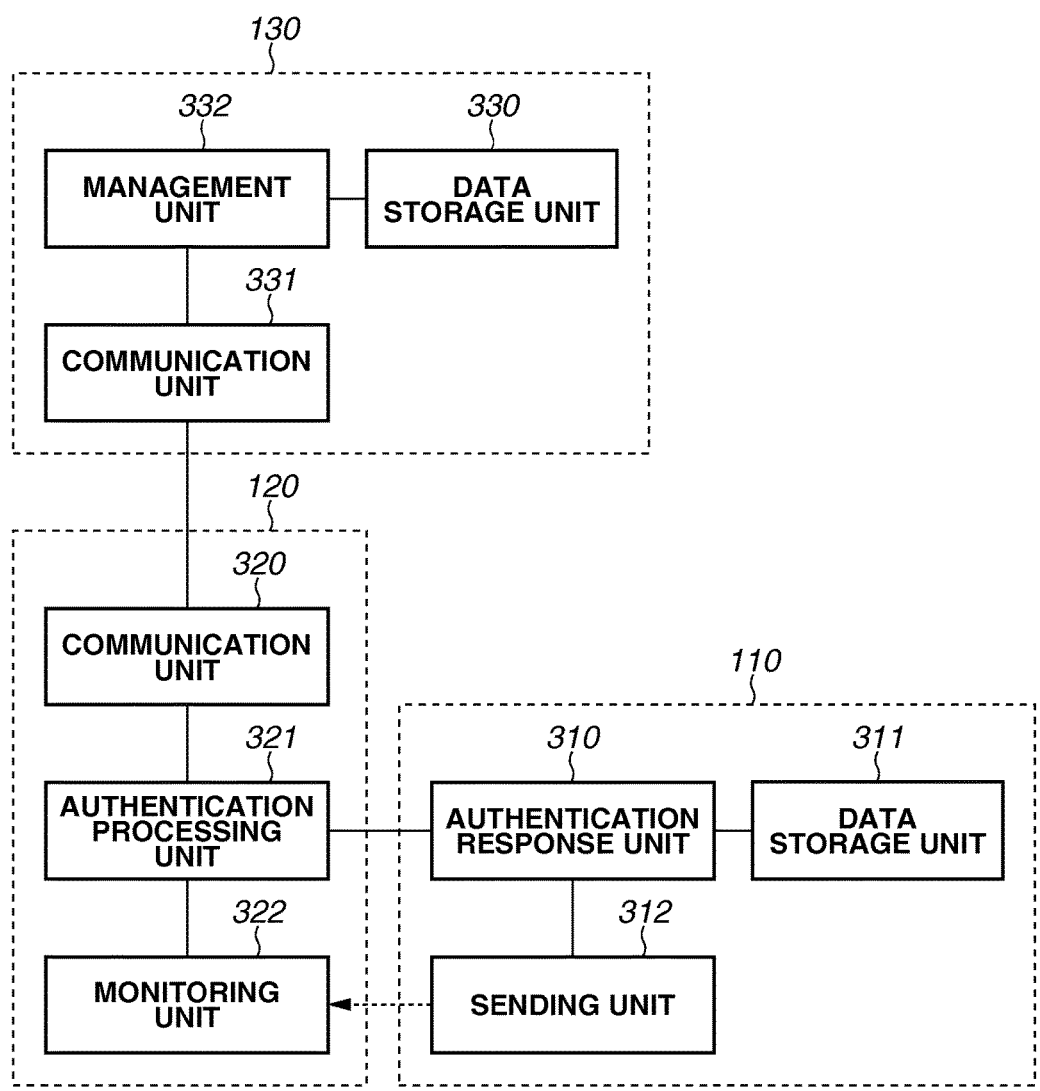
FIG. 3 is a diagram illustrating examples of software configurations of the apparatuses according to the exemplary embodiments.

FIG. 3 is a block diagram illustrating examples of software module configurations and functions of the apparatus, the device, and the server according to the present invention. Programs for achieving the functions illustrated in FIG. 3 are stored in the ROM 203 of the mobile device 110, the ROM 242 of the authentication apparatus 120, and the ROM 262 of the authentication server 130. These functions are achieved by the CPU 201, the CPU 240, and the CPU 260 loading the programs into the RAM 202, the RAM 241, and the RAM 261, respectively, and executing the programs.

The authentication server 130 includes a data storage unit 330, a communication unit 331, and a management unit 332.

The communication unit 331 includes a communication module supporting a communication method for communicating with the authentication apparatus 120. The communication module corresponds to an interface for communicating data with the authentication apparatus 120 and can communicate data with a communication module included in the authentication apparatus 120. The management unit 332 collates authentication information transmitted from the authentication apparatus 120 via the communication unit 331 with a user information list in the data storage unit 330, thereby performing an authentication process. Further, according to a request from the authentication apparatus 120, the management unit 332 acquires authentication apparatus information from the data storage unit 330, and transmits the authentication apparatus information to the authentication apparatus 120. The data storage unit 330 stores a user information list and an authentication apparatus information list.

FIGS. 4A and 4B illustrate examples of data tables stored in the data storage unit 330. FIG. 4A illustrates an example of the user information list. In this list, a user account (401), a password (402), authentication information (403), a universally unique identifier (UUID) (404), a major number (405), and a minor number (406) are managed. The user account (401) and the password (402) are information used when a user accesses the network 100 in the network system using a terminal (not illustrated). The authentication information (403) is authentication information used when a user is authenticated using the mobile device 110. Corresponding authentication information is also stored in the mobile device 110. When authentication is performed, the authentication information is encrypted using a key to be used. The UUID (404) is identification information of beacon information sent from the mobile device 110. The major number (405) and the minor number (406) are numbers for identifying a mobile device having the same UUID.

FIG. 4B illustrates an example of the information about (the list of) authentication apparatuses that is stored in the data storage unit 330. In this list, an apparatus ID (410), role information (411), and sending control information (412) are managed. The apparatus ID (410) is identification information that allows the unique identification of an authentication apparatus present on the network 100. In the data table illustrated in FIG. 4B, it is assumed that an authentication apparatus other than the authentication apparatus 120 is also present on the network 100. The role information (411) is information indicating the role of the authentication apparatus. For example, the role information (411) stores information that indicates the entrance and the location where the authentication apparatus is installed. The sending control information (412) stores control information about whether the mobile device 110 is to start or stop the sending of beacon information based on the authentication of the authentication apparatus. Part or all of the data managed in the data storage unit 330 may be managed in an external storage device.

The authentication apparatus 120 includes a communication unit 320, an authentication processing unit 321, and a monitoring unit 322.

According to an instruction from the authentication processing unit 321, the communication unit 320 communicates with the authentication server 130 via the NIC 244. The communication unit 320 includes a communication module supporting a communication method for communicating with the authentication server 130. The communication module corresponds to an interface for communicating data with the authentication server 130 and can communicate data with a communication module included in the authentication server 130.

The authentication processing unit 321 controls the communication unit 320 to perform, via the NIC 244 or the reader/writer 245, an authentication process using authentication information acquired from the mobile device 110. Further, the authentication processing unit 321 transmits to the mobile device 110 a control request for the start or stop of the sending of beacon information. The authentication processing unit 321 includes a communication module supporting a communication method for communicating with an authentication response unit 310 of the mobile device 110. The communication module corresponds to an interface for communicating data with the authentication response unit 310 of the mobile device 110, and can communicate data with a communication module included in the authentication response unit 310 of the mobile device 110. The monitoring unit 322 monitors beacon information sent from the mobile device 110. The monitoring unit 322 includes a communication module supporting a communication method for communicating with a sending unit 312 of the mobile device 110 via the beacon 246. The communication module corresponds to an interface for receiving beacon information sent from a communication module included in the sending unit 312 of the mobile device 110.

The mobile device 110, which is a device for authenticating an individual or a device body, includes the authentication response unit 310, a data storage unit 311, and the sending unit 312.

The authentication response unit 310 controls, for example as a response to an authentication request transmitted from the authentication apparatus 120, a transmission of authentication information of the data storage unit 311, via the reader/writer response unit 205. Further, the authentication response unit 310 receives, as a result of transmitting the authentication information, a control request for the start or stop of the sending of beacon information, from the authentication apparatus 120. The authentication response unit 310 controls the sending unit 312 to start or stop the sending of the beacon information according to the received control request. The authentication response unit 310 includes a communication module supporting a communication method for communicating with the authentication processing unit 321 of the authentication apparatus 120. The communication module corresponds to an interface for communicating data with the authentication processing unit 321 of the authentication apparatus 120, and can communicate data with the communication module included in the authentication processing unit 321 of the authentication apparatus 120. The data storage unit 311 stores authentication information and beacon information.

According to an instruction from the authentication response unit 310, the sending unit 312 starts or stops the sending of a signal including identification information for identifying the mobile device 110 or the user of the mobile device 110. More specifically, the sending unit 312 controls the start or stop of the sending of beacon information using BLE via the beacon 206.

FIG. 5 illustrates an example of the authentication information and the beacon information stored in the data storage unit 311. This table includes authentication information (420), a UUID (421), a major number (422), and a minor number (423). The authentication information (420), the UUID (421), the major number (422), and the minor number (423) are similar to the pieces of data having the same names described with reference to FIG. 4A.

Figure 6:
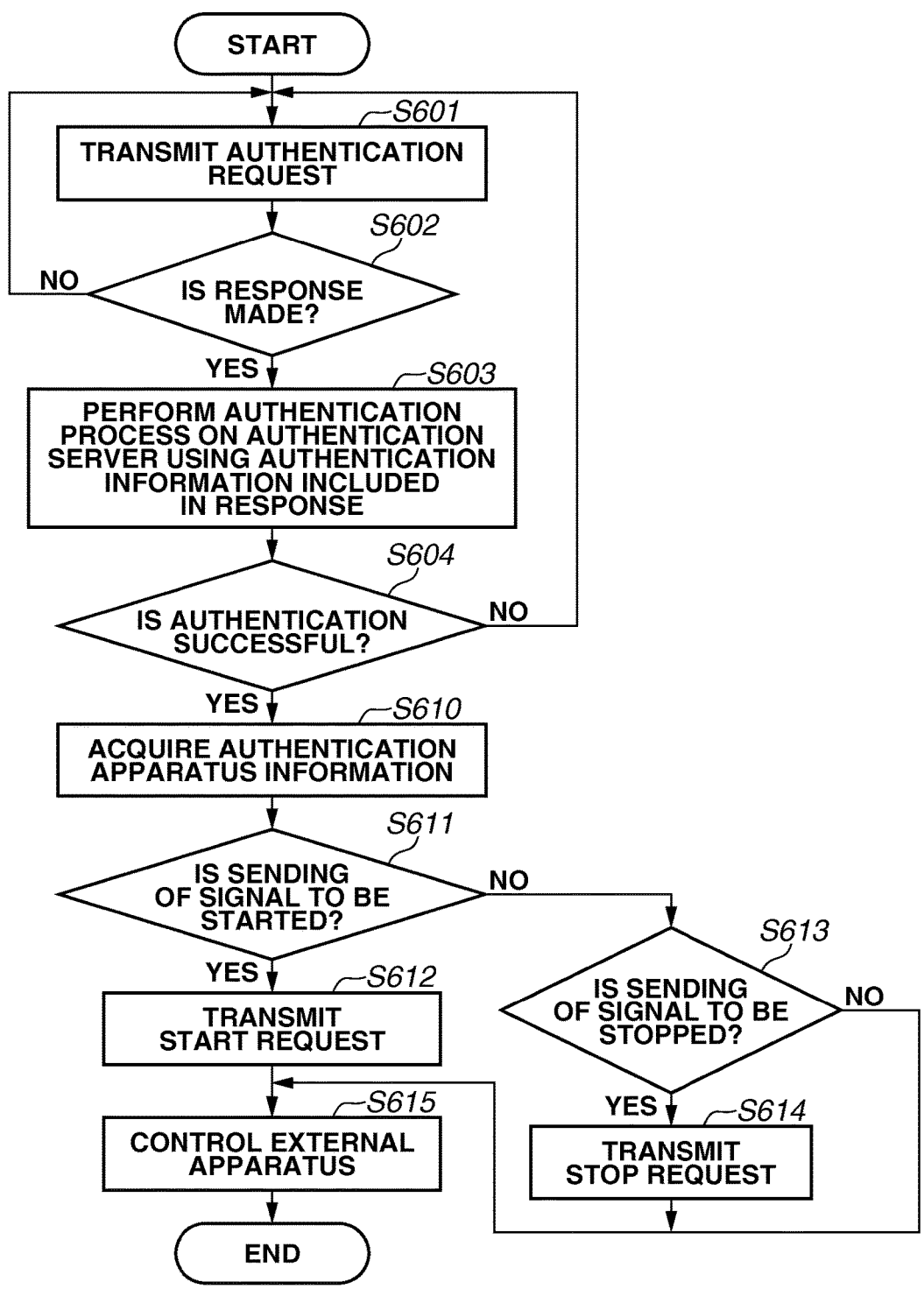
FIG. 6 is a flowchart illustrating processes performed by an authentication apparatus, according to a first exemplary embodiment.

With reference to a flowchart illustrated in FIG. 6, an authentication process with the mobile device 110 and the process of requesting control of the start or stop of the sending of beacon information, which are performed by the authentication apparatus 120, will be described below.

First, in step S601, the authentication processing unit 321 transmits an authentication request. In this authentication request, the destination of the request is not specified. Thus, for example, if there is a mobile device approaching the authentication apparatus 120, the mobile device receives the authentication request. In step S602, the authentication processing unit 321 determines whether the mobile device 110 having received the above authentication request makes a response to the request. If it is determined that the mobile device 110 makes a response (Yes in step S602), the processing proceeds to step S603.

In step S603, the authentication processing unit 321 identifies authentication information included in the response from the mobile device 110 and gives an authentication instruction to the communication unit 320. If the communication unit 320 receives the authentication instruction, the communication unit 320 transmits the identified authentication information together with an authentication request to the authentication server 130, and receives an authentication result. In step S604, based on the authentication result received from the communication unit 320, the authentication processing unit 321 determines whether the authentication process is successful. If it is determined that the authentication process is successful (Yes in step S604), the processing proceeds to step S610. If it is determined that the authentication process failed (No in step S604), the processing returns to step S601.

In step S610, the authentication processing unit 321 transmits, to the authentication server 130 via the communication unit 320, an acquisition request to acquire authentication apparatus information using an identifier (an apparatus ID) of the authentication apparatus 120 managed in a storage unit in the authentication apparatus 120. Then, the authentication processing unit 321 acquires authentication apparatus information returned as a response to the request. The authentication apparatus information may not be acquired from the authentication server 130, but may be stored in a storage unit of the authentication apparatus 120 or managed by another dedicated server.

FIG. 9 illustrates an example of the authentication apparatus information acquired in step S610. This information includes an apparatus ID (430), role information (431), and sending control information (432). The apparatus ID (430), the role information (431), and the sending control information (432) are similar to the apparatus ID (410), the role information (411), and the sending control information (412) described with reference to FIG. 4B, respectively.

In step S611, based on the sending control information included in the authentication apparatus information acquired in step S610, the authentication processing unit 321 determines whether the sending of a signal (beacon information in the present exemplary embodiment) including particular identification information is to be started. In the example of FIG. 9, as the sending control information (432), information indicating "send" is stored. Thus, it is determined that the sending of the signal is to be started. If it is determined that the sending is to be started (Yes in step S611), the processing proceeds to step S612. If it is not determined that the sending is to be started (No in step S611), the processing proceeds to step S613. In step S612, the authentication processing unit 321 transmits to the mobile device 110 a sending request to start the sending of the signal (beacon information).

In step S613, based on the sending control information included in the authentication apparatus information acquired in step S610, the authentication processing unit 321 determines whether the sending of a signal (beacon information in the present exemplary embodiment) including particular identification information is to be stopped. If it is determined that the sending of the signal is to be stopped (Yes in step S614), the processing proceeds to step S614. If it is not determined that the sending of a signal is to be stopped (No in step S614), the processing proceeds to step S615. In step S614, the authentication processing unit 321 transmits to the mobile device 110 a stop request to stop the sending of the signal (beacon information).

In step S615, the authentication processing unit 321 controls an external apparatus. The control of the external apparatus may be performed using the role information included in the authentication apparatus information acquired in step S610. In the example of FIG. 9, it is indicated that the authentication apparatus 120 is installed at an "entrance" of a "gate A", which is an external apparatus. Thus, the authentication processing unit 321 instructs the "gate A" to release a lock.

According to the example of the processes described above with reference to FIG. 6, if the user performs an authentication operation on the authentication apparatus 120 using the mobile device 110 to open the "entrance" of the "gate A" illustrated in FIG. 9, the mobile device 110 automatically starts the sending of beacon information.

The monitoring unit 322 of the authentication apparatus 120 receives beacon information and distance information sent from the mobile device 110, and transmits the beacon information and the distance information to the authentication server 130, thereby monitoring the mobile device 110 or the beacon information.

FIG. 10 illustrates an example of monitoring information based on the beacon information acquired from the mobile device 110. A UUID (440), a major number (441), and a minor number (442) are similar to the UUID (404), the major number (405), and the minor number (406) described with reference to FIG. 4A, respectively. Distance information (443) included in the monitoring information is information indicating a distance between the authentication apparatus 120 and the mobile device 110 that is a distance between two points at the sending end and the receiving end of the beacon information. For example, the distance information indicates any one of "immediate", "near", "far", and "outside the range" as the distance between the two points. This information is analyzed based on the intensity of the signal received at the receiving end of the beacon information.

As described above, the beacon information may be monitored by one or more control apparatuses (not illustrated) other than the authentication apparatus 120. In such a case, the monitoring process performed by each control apparatus enables control of the provision of a different service to the user having the mobile device 110, according to the content of the beacon information and the distance information about the distance from the mobile device 110.

Figure 7:
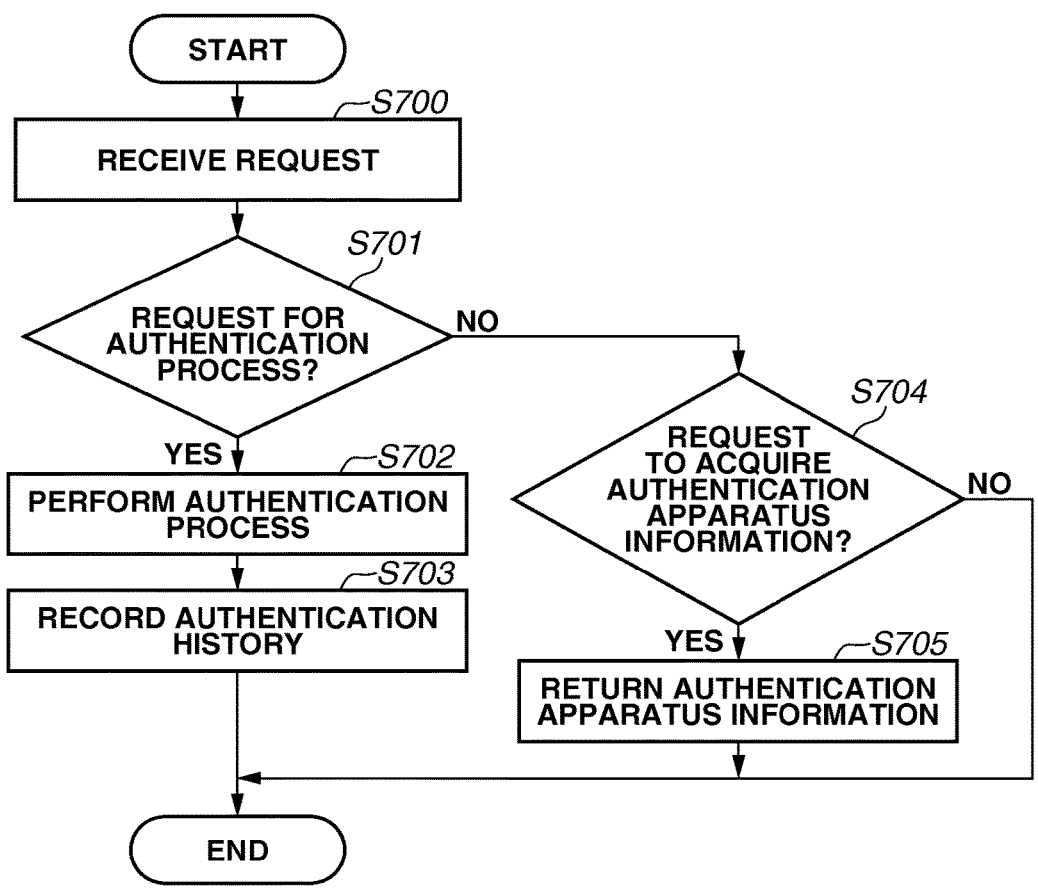
FIG. 7 is a flowchart illustrating a process performed by an authentication server, according to the first exemplary embodiment.

With reference to a flowchart illustrated in FIG. 7, an authentication process performed by the authentication server 130 will be described below. When this process is started, first, as illustrated in step S700, the management unit 332 receives a request from outside the authentication server 130 via the communication unit 331.

In step S701, the management unit 332 determines whether the request received via the communication unit 331 is a request for an authentication process from the authentication apparatus 120. If it is determined that an authentication request is received (Yes in step S701), the processing proceeds to step S702. If not (No in step S701), the processing proceeds to step S704. In step S702, the management unit 332 receives authentication information together with the authentication request from the authentication apparatus 120, and performs an authentication process. The authentication process is performed by collating the authentication information received from the authentication apparatus 120 with the user information list stored in the data storage unit 330. The management unit 332 returns the result of performing the authentication process to the authentication apparatus 120 via the communication unit 331.

FIG. 4A illustrates an example of the user information list stored in the data storage unit 330. FIG. 4A is as described above. In the example of FIG. 4A, if the authentication information received from the authentication apparatus 120 is "gi9j39t74mks", the authentication information (403) includes information that matches the received authentication information. Thus, the authentication of a user account (a "User A") associated with the authentication information is successful. The authentication information is encrypted using a (cryptographic) key to be used. The authentication method in the present exemplary embodiment is just an example. Alternatively, another authentication technique for authenticating a user or a device can also be used.

In step S703, the management unit 332 records the result of performing the authentication process, as authentication history information in association with the user information. FIG. 11 illustrates an example of the authentication history information stored in the data storage unit 330 in step S703. In the authentication history information, information about the user account (the "User A") authenticated as described above, authentication date and time (456), and an authentication location/apparatus ID (457) are managed. As the authentication date and time (456), the date and time when the authentication process has been performed is stored. As the authentication location/apparatus ID (457), identification information that allows the identification of the authentication apparatus 120 having performed the authentication is stored.

In step S704, the management unit 332 determines whether the request received via the communication unit 331 is an acquisition request from the authentication apparatus 120 to acquire authentication apparatus information. If it is determined that an acquisition request is received (Yes in step S704), the processing proceeds to step S705. If it is determined that an acquisition request is not received (No in step S704), this processing ends. In step S705, the management unit 332 collates an apparatus ID received together with the acquisition request from the authentication apparatus 120 via the communication unit 331 with the authentication apparatus information list (FIG. 4B) stored in the data storage unit 330. If there is authentication apparatus information associated with the received apparatus ID, the management unit 332 returns the authentication apparatus information to the authentication apparatus 120. An example of the authentication apparatus information returned as a result of collating the apparatus ID is as illustrated above with reference to FIG. 9.

The management unit 332 monitors beacon information sent from the mobile device 110. For example, the management unit 332 receives the beacon information and the distance information illustrated in FIG. 10 from the authentication apparatus 120 or a control apparatus (not illustrated) having the function of receiving beacon information. According to the reception, the management unit 332 stores the distance information as history information in association with user information in the data storage unit 330. At this time, the user information to be associated therewith can be identified from identification information in the beacon information.

FIG. 12 illustrates an example of the history information stored in the data storage unit 330 to be monitored by the management unit 332 and including the distance information. As reception date and time (466), the date and time when the beacon information has been received is stored. As a reception location/reception apparatus ID (467), identification information that allows the identification of the authentication apparatus 120 or a control apparatus (not illustrated) having received the beacon information is stored. Distance information (468) is similar to the distance information (443) in FIG. 10. The authentication server 130 thus monitors beacon information in an integrated manner, and thereby can grasp the current position and the history of movement of the mobile device 110.

Figure 8:
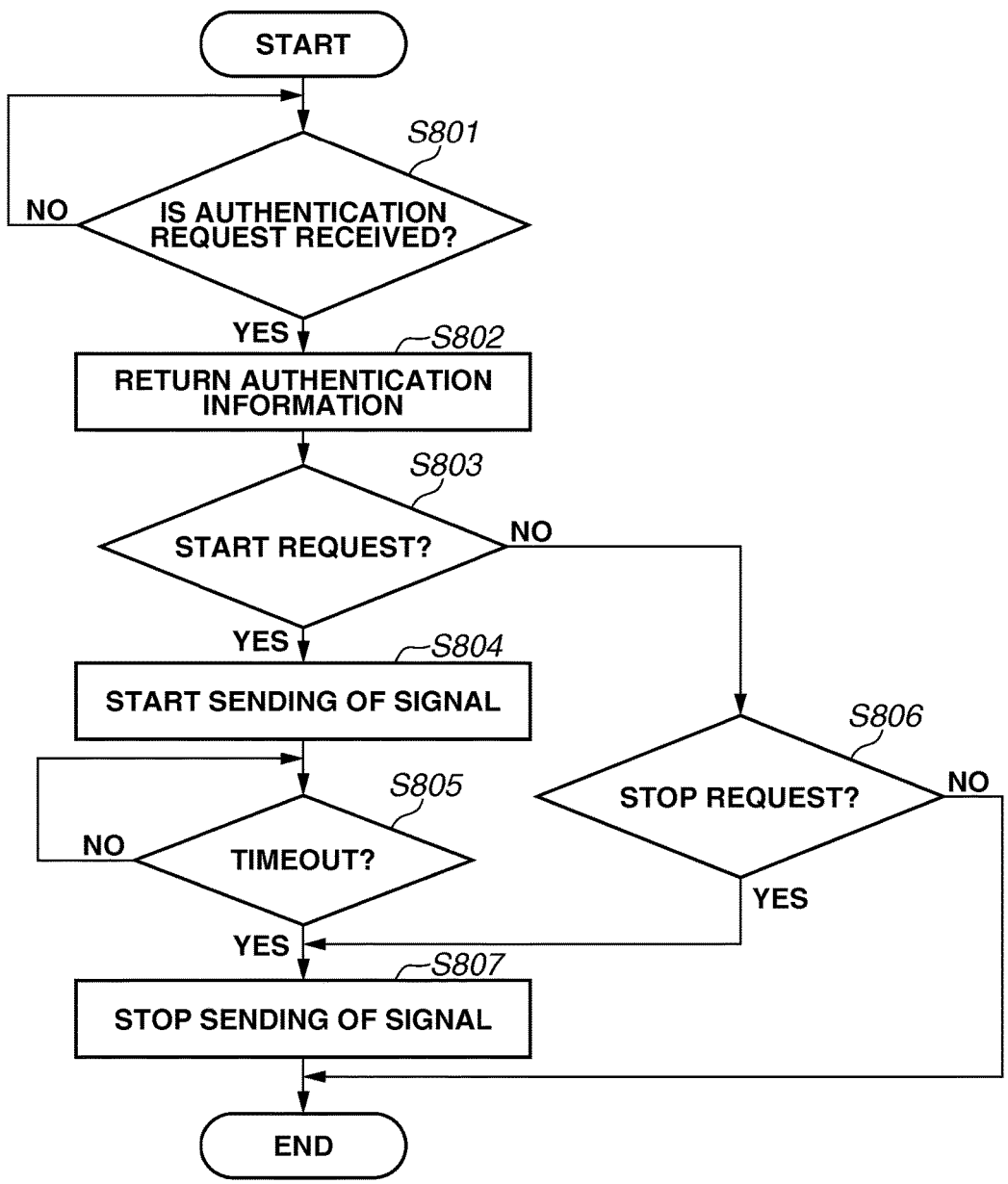
FIG. 8 is a flowchart illustrating processes performed by a mobile device, according to the first exemplary embodiment.

Next, with reference to a flowchart illustrated in FIG. 8, a process related to authentication and a process related to control of the sending of beacon information, which are performed by the mobile device 110, will be described below.

In step S801, the authentication response unit 310 determines whether an authentication request is received from the authentication apparatus 120. If it is determined that an authentication request is received (Yes in step S801), the processing proceeds to step S802. In step S802, the authentication response unit 310 acquires authentication information from the data storage unit 311, and transmits the authentication information to the authentication apparatus 120. FIG. 5 illustrates examples of the authentication information and the beacon information stored in the data storage unit 311. The authentication response unit 310 acquires and returns the authentication information (420) in this information.

In step S803, the authentication response unit 310 determines whether a start request to start the sending of a signal (beacon information) including predetermined identification information is received together with an authentication result from the authentication apparatus 120. If it is determined that a start request is received (Yes in step S803), the processing proceeds to step S804. If not (No in step S803), the processing proceeds to step S806.

In step S804, the authentication response unit 310 gives a start instruction to the sending unit 312 to start the sending of a signal acquired from the data storage unit 311. More specifically, beacon information including the UUID (421), the major number (422), and the minor number (423) as illustrated in FIG. 5 is periodically sent using a wireless communication technique such as BLE. If the sending of beacon information has already been started, the sending is continued.

In step S805, the authentication response unit 310 determines a timeout related to the sending of the signal. The determination of whether a timeout occurs is made as follows. The authentication response unit 310 counts the elapsed time after the sending of the beacon information is started. Then, based on whether the elapsed time exceeds a predetermined timeout value stored in the data storage unit 311, the authentication response unit 310 determines whether a timeout occurs. If it is determined that a timeout occurs (Yes in step S805), the processing proceeds to step S807.

In step S806, the authentication response unit 310 determines whether a stop request to stop the sending of a signal (beacon information) including predetermined identification information is received together with an authentication result from the authentication apparatus 120. If it is determined that a stop request is received (Yes in step S806), the processing proceeds to step S807. If it is determined that a stop request is not received (No in step S806), this processing ends. In step S807, the authentication response unit 310 gives a stop instruction to the sending unit 312 to stop the sending of the signal.

Application Example 1

The determination of a timeout in step S805 may not be made. In this case, the mobile device 110 continues the sending of the beacon information until the mobile device 110 receives from the authentication apparatus 120 a stop request to stop the sending of the beacon information.

Application Example 2

As the determination of a timeout in step S805, a form is also possible in which the determination is made not according to the predetermined timeout value stored in advance in the data storage unit 311 of the mobile device 110, but according to a sending timeout value transmitted from the authentication apparatus 120. This form will be described next.

In this example, the data storage unit 330 of the authentication server 130 stores a list of pieces of authentication apparatus information as illustrated in FIG. 13. In this list, as a sending timeout value (473), values are set for several pieces of authentication apparatus information. An apparatus ID (470), role information (471), and sending control information (472) are similar to the above pieces of information having the same names. As a response to an acquisition request from the authentication apparatus 120 to acquire authentication apparatus information, the management unit 332 of the authentication server 130 returns authentication apparatus information included in the list.

In step S610, the authentication processing unit 321 of the authentication apparatus 120 acquires authentication apparatus information including a sending timeout value as illustrated in FIG. 14.

The authentication apparatus information illustrated in FIG. 14 includes an apparatus ID (480), role information (481), sending control information (482), and a sending timeout value (483). The apparatus ID (480), the role information (481), and the sending control information (482) are similar to the pieces of information described with reference to FIG. 4B and having the same names. As the sending timeout value (483), the timeout value after the sending of the beacon information is started is stored in seconds. In step S612, the authentication processing unit 321 transmits to the mobile device 110 the sending timeout value together with a sending request to send beacon information. In the determination of a timeout in step S805, the mobile device 110 uses this sending timeout value.

Application Example 3

A form is also possible in which the content of beacon information sent from the mobile device 110 is switched according to an instruction from the authentication apparatus 120. This form will be described next.

In step S612, the authentication processing unit 321 of the authentication apparatus 120 transmits to the mobile device 110 the apparatus ID of the authentication apparatus 120 together with a start request to start the sending of a signal. The apparatus ID transmitted at this time is the same as the information included in the authentication apparatus information acquired in step S610.

In step S803, the authentication response unit 310 of the mobile device 110 determines whether a start request and an apparatus ID are received together with an authentication result from the authentication apparatus 120. If it is determined that a start request and an apparatus ID are received, the processing proceeds to step S804. Then, in step S804, the authentication response unit 310 instructs the sending unit 312 to start the sending of beacon information. The beacon information which has started to be sent at this time is information obtained by reflecting the apparatus ID received from the authentication apparatus 120 on the minor number in the beacon information acquired from the data storage unit 311.

FIG. 15A illustrates an example of the beacon information sent from the sending unit 312 in this application example. The beacon information includes a UUID (490), a major number (491), and a minor number (492). As the minor number (492), the apparatus ID received from the authentication apparatus 120 is stored.

All apparatus IDs received in the past from a plurality of authentication apparatuses including the authentication apparatus 120 may be stored in order and managed. FIG. 15B is an example where all apparatus IDs received in the past are stored in order as the minor number (497). Further, the storage location for an apparatus ID is not limited to the minor number, and may be the major number or another storage area in the beacon information.

Information stored in beacon information is not limited to an apparatus ID, and may be any information that is transmitted from the authentication apparatus 120. That is, according to a service using this signal (beacon information), identification information required for the control of the provided service can be appropriately defined and sent from the mobile device 110.

When the authentication apparatus 120 transmits an authentication result and a start request to the mobile device 110, the authentication apparatus 120 can transmit information for specifying the content of a signal to be transmitted, instead of the apparatus ID. In this case, the data storage unit 311 of the mobile device 110 stores a plurality of pieces of beacon information having different contents. Then, according to the transmitted specifying information, the mobile device 110 selectively controls the start of the sending of a signal in step S804.

Application Example 4

In step S802, the authentication response unit 310 of the mobile device 110 can also receive a start request to start the sending of a plurality of signals (pieces of beacon information) having different contents together with an authentication result from the authentication apparatus 120 and can perform control. In this case, the authentication response unit 310 adjusts the timing and the cycle of the sending of beacon information having the content stored in the data storage unit 311 of the mobile device 110 and beacon information based on an instruction from the authentication apparatus 120 described in application example 3, and sends these pieces of beacon information at the same time or by shifting the timing.

Further, in step S802, the authentication response unit 310 of the mobile device 110 can also receive both a start request to start the sending of a signal (beacon information) and a stop request to stop the sending of a signal (beacon information) together with an authentication result from the authentication apparatus 120 and can perform control. In this case, based on specification included in the start request, the authentication response unit 310 applies the process of step S804 to the beacon information which is to start to be sent, and starts the sending of the signal. Further, based on specifying included in the stop request, the authentication response unit 310 applies the process of step S807 to the beacon information which is to stop being sent, and stops the sending of the signal.

According to the first exemplary embodiment, the user having the mobile device 110 performs authentication using the authentication apparatus 120 in the system, thereby controlling the start or stop of the sending of a signal (beacon information). Then, the authentication server 130 can monitor the authentication path of the user based on the beacon information sent from the mobile device 110 and monitored by the authentication server 130. Further, according to an authentication operation by the user using the mobile device 110, a service corresponding to a signal (beacon information) sent from the mobile device 110 is automatically provided to the user by a control apparatus (not illustrated).

In the first exemplary embodiment, the form has been described in which, if the elapsed time exceeds the predetermined timeout value after the mobile device 110 sends a signal (beacon information) according to an authentication process, the sending of the signal is stopped. In a second exemplary embodiment, taking security into further account, the form is described in which, after the mobile device 110 sends a signal and if it is detected that the mobile device 110 moves out of a predetermined range, the authentication server 130 gives a warning notification to the user.

The configuration of a system according to the present exemplary embodiment, and the hardware configuration and the software configuration of each device included in the system are similar to those in the first exemplary embodiment.

Figure 17:
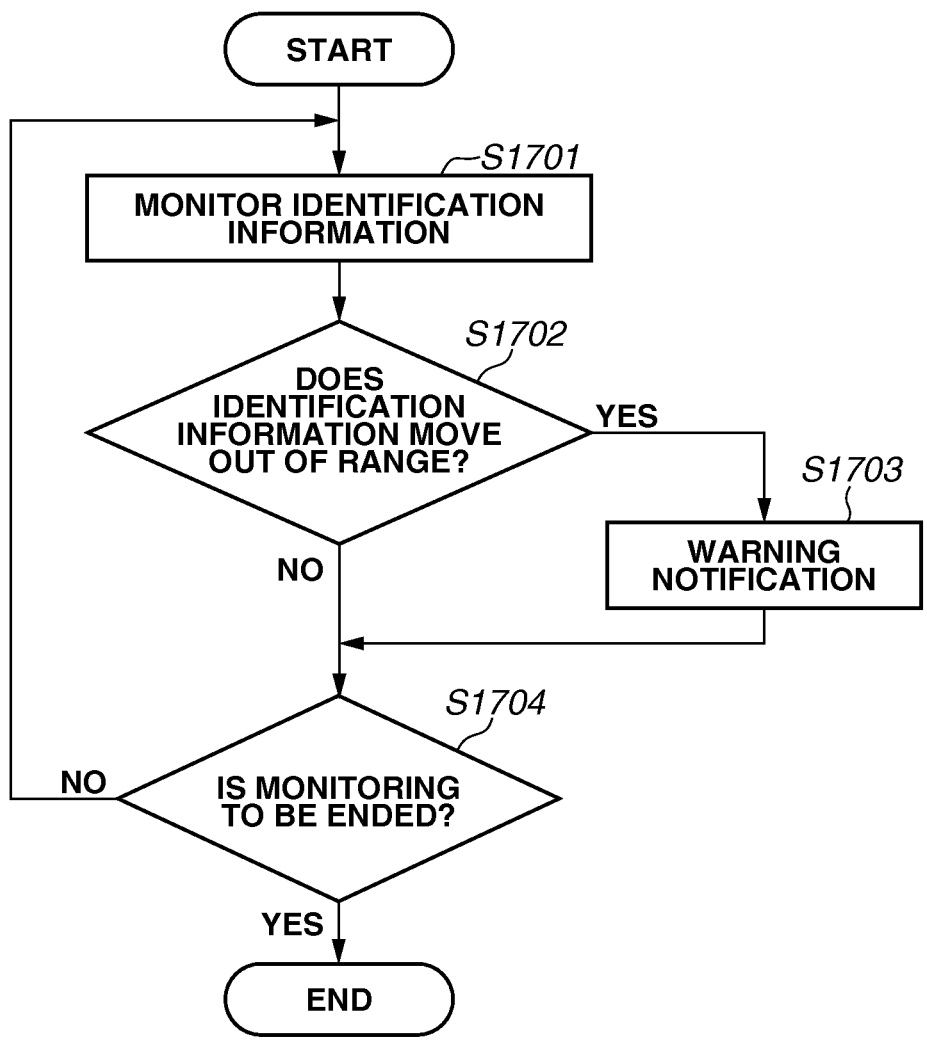
FIG. 17 is a flowchart illustrating a process performed by an authentication server according to a second exemplary embodiment.

With reference to a flowchart illustrated in FIG. 17, a monitoring process performed by the authentication server 130 will be described below.

In step S1701, to monitor a signal (beacon information) sent from the mobile device 110, the management unit 332 refers to a management table of history information (FIG. 19). In step S1702, based on a result of the reference, the management unit 332 determines whether the beacon information to be monitored moves out of a predetermined range. If it is determined that the beacon information to be monitored moves out of the range (Yes in step S1702), the processing proceeds to step S1703. If it is determined that the beacon information to be monitored does not move out of the range (No in step S1702), the processing proceeds to step S1704.

FIG. 19 illustrates an example of the management table, stored in the data storage unit 330, of the history information including distance information. In this table, a user account (501), a password (502), authentication information (504), a UUID (505), a major number (506), a minor number (507), a reception date and time (508), a reception location/reception apparatus ID (509), and distance information (510) are similar to the pieces of information having the same names in FIG. 12.

An email address (503) is an email address of the user of the mobile device 110. In the example of FIG. 19, if the distance information about the distance from the reception location/reception apparatus ID (509), which is "123456" (the authentication apparatus 120), is "far" or "outside the range (no reception)", and beacon information is not received from a reception apparatus indicated by the other beacon information, it is determined that the beacon information to be monitored moves out of the range.

At this time, examples of the state of being outside the predetermined range also include a case where distance information about the distance from all authentication apparatuses in the system is "far" or "outside the range". Further, the examples may also include a case where distance information about the distance from a particular authentication apparatus is "far" or "outside the range". The definition of the state of being outside the predetermined range may be appropriately set by a system operator, taking security into account.

In step S1703, the management unit 332 transmits a warning notification to an email address identified by the user information associated with the beacon information that moves out of the predetermined range according to the determination. If the mobile device 110 is not a security card but a terminal capable of receiving electronic mail, such as a smartphone, the management unit 332 may give this warning notification to the mobile device 110.

FIG. 18 illustrates an example of the contents of the warning notification. In an area 1801, the sender of the email, the destination email address, and the subject are displayed. In an area 1802, the contents of the warning notification are displayed. The warning notification includes a content warning the user that a predetermined signal (beacon information) is continuing to be inadvertently sent from the mobile device (the security card). The contents also include an appropriate authentication path for stopping the signal.

In step S1704, the management unit 332 determines whether the monitoring is to be ended. If the administrator of the authentication server 130 instructs the authentication server 130 to end the monitoring, then the monitoring unit determines that the monitoring is to be ended. If it is determined that the monitoring is to be ended (Yes in step S1704), this processing ends. If the management unit 332 determines that the monitoring is not to be ended (No in step S1704), processing returns to step S1701.

Consequently, even if the mobile device 110 moves out of a predetermined range, such as moving out of an office, while the mobile device 110 keeps sending beacon information, the user receives a warning notification, and thereby can be aware of this situation.

The present invention also includes an apparatus, a system, and a method configured by appropriately combining the above exemplary embodiments.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-194368, filed Sep. 24, 2014, which is hereby incorporated by reference herein in its entirety.

What is claimed is:

1. A system including a mobile device, an authentication system, and a control apparatus capable of controlling a provision of a service according to a reception of a signal sent from the mobile device, the mobile device comprising, a memory storing instructions; and a processor which is capable of executing the instructions causing the mobile device to:

transmit authentication information to the authentication system;

receive from the authentication system a request according to success of authentication using the authentication information; and according to the received request, control at least one of a start and a stop of a function of sending a signal at a predetermined frequency or on a predetermined cycle using wireless communication, wherein a content of a signal, which is sent by using the started function, changes according to a content of the request from the external authentication system, wherein, in a case where the control apparatus receives a signal sent from the mobile device according to the start of the function, the control apparatus provides a service corresponding to a content of the signal, and wherein a signal sent, which is sent by using the started function, includes a UUID, a major number and a minor number.

2. A method in a system including a mobile device, an authentication system, and a control apparatus capable of controlling a provision of a service according to a reception of a signal sent from the mobile device, the method comprising:
   transmitting authentication information to the authentication system by the mobile device;
   receiving from the authentication system a request according to success of authentication using the authentication information by the mobile device; and
   controlling by the mobile device, according to the received request, at least one of a start and a stop of a function of sending a signal at a predetermined frequency or on a predetermined cycle using wireless communication,
   wherein a content of a signal, which is sent by using the started function, changes according to a content of the request from the external authentication system,
   wherein, in a case where the control apparatus receives a signal sent from the mobile device according to the start of the function, the control apparatus provides a service corresponding to a content of the signal, and
   wherein a signal sent, which is sent by using the started function, includes a UUID, a major number and a minor number.

3. A mobile device for performing communication for authentication with an external authentication system, the mobile device comprising,
   a memory storing instructions; and
   a processor which is capable of executing the instructions causing the mobile device to:
   transmit authentication information to the authentication system;
   receive from the authentication system a request according to success of authentication using the authentication information; and
   according to the received request, control at least one of a start and a stop of a function of sending a signal at a predetermined frequency or on a predetermined cycle using wireless communication,
   wherein a content of a signal, which is sent by using the started function, changes according to a content of the request from the external authentication system, and
   wherein a signal, which is sent by using the started function, includes a UUID, a major number and a minor number.

4. The mobile device according to claim 3, wherein the instructions further cause the mobile device to, in a case where a request to stop the function is received as the request from the authentication system, stop the function.

5. The mobile device according to claim 3, wherein the instructions further cause the mobile device to, in a case where a request to start the function is received as the request from the authentication system, start the function.

6. The mobile device according to claim 3, wherein the instructions further cause the mobile device to, in a case where a specified time elapses after the function is started, stop the function.

7. The mobile device according to claim 6, wherein the specified time is specified by the authentication system.

8. The mobile device according to claim 3, wherein the content of the signal, which is sent by using the function, is a content based on information selected according to a content of the request from the external authentication system from information managed by the mobile device.

9. The mobile device according to claim 3, wherein a signal, which is sent using the function, further includes identification information for identifying a mobile device or a user of a mobile device.

10. The mobile device according to claim 3, wherein, in a case where it is detected that the mobile device moves out of a predetermined range based on a signal sent from the authentication system using the function, a warning notification is given to a destination corresponding to a mobile device or a user of a mobile device identified by the identification information.

11. The mobile device according to claim 3, wherein the function uses Bluetooth low energy as wireless communication.

12. A method in a mobile device for performing communication for authentication with an external authentication system, the method comprising:
   transmitting authentication information to the authentication system;
   receiving from the authentication system a request according to success of authentication using the authentication information; and
   controlling, according to the received request, at least one of a start and a stop of a function of sending a signal at a predetermined frequency or on a predetermined cycle using wireless communication,
   wherein a content of a signal, which is sent by using the started function, changes according to a content of the request from the external authentication system, and
   wherein a signal, which is sent by using the started function, includes a UUID, a major number and a minor number.

13. The method according to claim 12, wherein the function uses Bluetooth low energy as wireless communication.

14. A non-transitory computer readable storage medium on which is stored a computer program for causing a computer to execute a method in a portable device for performing communication for authentication with an external authentication system, the method comprising:
   transmitting authentication information to the authentication system;
   receiving from the authentication system a request according to success of authentication using the authentication information; and
   controlling, according to the received request, at least one of a start and a stop of a function of sending a signal at a predetermined frequency or on a predetermined cycle using wireless communication,
   wherein a content of a signal, which is sent by using the started function, changes according to a content of the request from the external authentication system, and
   wherein a signal, which is sent by using the started function, includes a UUID, a major number and a minor number.

15. The system according to claim 1, wherein the mobile device is at least one of a card device, a phone device, an eyeglass-type information device, a wristwatch-type information device, a car navigation system and a robot.

16. The system according to claim 1, wherein the instructions further cause the mobile device to, according to a content of the request from the authentication system, change a content of a signal to be sent using the function.

17. The system according to claim 1, wherein the authentication system is configured to manage authentication history information including a user account of a user of the mobile device, authentication information, a UUID related to the signal sent by using the function, the major and minor numbers related to the signal and distance information indicating distance from a particular authentication apparatus.

18. The mobile device according to claim 3, wherein the mobile device is at least one of a card device, a phone device, an eyeglass-type information device, a wristwatch-type information device, a car navigation system and a robot.

* * * * *